United States Patent
Fuchs et al.

(10) Patent No.: US 10,741,295 B2
(45) Date of Patent: Aug. 11, 2020

(54) NUCLEAR FACILITY

(71) Applicant: FRAMATOME GMBH, Erlangen (DE)

(72) Inventors: Thomas Fuchs, Wesseling (DE); Leo Ornot, Nuremberg (DE); Markus Reck, Erlangen (DE); Matthias Reuter, Groitzsch (DE)

(73) Assignee: Framatome GmbH, Erlangen (DE)

( * ) Notice: Subject to any disclaimer, the term of this patent is extended or adjusted under 35 U.S.C. 154(b) by 363 days.

(21) Appl. No.: 15/266,059

(22) Filed: Sep. 15, 2016

(65) Prior Publication Data

US 2017/0004894 A1 Jan. 5, 2017

Related U.S. Application Data

(63) Continuation of application No. PCT/EP2015/055532, filed on Mar. 17, 2015.

(30) Foreign Application Priority Data

Mar. 19, 2014 (DE) .................. 10 2014 205 085

(51) Int. Cl.
*G21C 19/40* (2006.01)
*G21C 19/07* (2006.01)
*G21C 19/08* (2006.01)

(52) U.S. Cl.
CPC ............. *G21C 19/40* (2013.01); *G21C 19/07* (2013.01); *G21C 19/08* (2013.01)

(58) Field of Classification Search
CPC ........ G21C 19/07; G21C 19/40; G21C 19/04; G21C 19/08; G21F 5/00; G21F 5/008; G21F 5/012
See application file for complete search history.

(56) References Cited

U.S. PATENT DOCUMENTS 3,800,857 A  4/1974 Verbeke et al.
4,203,038 A * 5/1980 Takahashi .............. G21C 19/07
                                                    376/272
(Continued)

FOREIGN PATENT DOCUMENTS

CA    2483182 C    1/2011
CH    626740 A5 * 11/1981 ............. G21C 19/07
(Continued)

OTHER PUBLICATIONS

An English machine transalation of Kumpf, DE 2944962A1, downloaded on Mar. 8, 2018 from https://worldwide.espacenet.com/publicationDetails/biblio?ll=0&ND=3&adjacent=true&locale=en_EP&FT=D&date=19810521&CC=DE&NR=2944962A1&KC=A1 (Year: 1981).*

(Continued)

*Primary Examiner* — Lily C Garner
(74) *Attorney, Agent, or Firm* — Laurence A. Greenberg; Werner H. Stemer; Ralph E. Locher

(57) ABSTRACT

A nuclear facility includes a fuel element pool which is filled with a cooling liquid. A fuel element rack, which is disposed in the fuel element pool, includes compartments for receiving fuel elements. The fuel elements received in the compartments are in direct contact with the cooling liquid in the fuel element pool. At least one cooling element is disposed in one of the compartments instead of a fuel element. The cooling element acts as a heat exchanger through which a coolant can flow, the cooling element is connected into a cooling circuit and the cooling element is immersed in the cooling liquid.

8 Claims, 4 Drawing Sheets

(56) References Cited

U.S. PATENT DOCUMENTS

| | | | |
|---|---|---|---|
| 4,289,196 A | 9/1981 | Jabsen et al. | |
| 2008/0260088 A1* | 10/2008 | Singh | G21C 19/07 |
| | | | 376/272 |
| 2012/0051484 A1 | 3/2012 | Schmidt et al. | |
| 2012/0250813 A1 | 10/2012 | Lloyd et al. | |
| 2012/0294407 A1 | 11/2012 | Namba et al. | |
| 2012/0294737 A1* | 11/2012 | Singh | F28B 1/06 |
| | | | 417/410.1 |

FOREIGN PATENT DOCUMENTS

| | | | | |
|---|---|---|---|---|
| CN | 103460299 A | 12/2013 | | |
| DE | 2944962 A1 | 5/1981 | | |
| DE | 3130109 A1 | 2/1983 | | |
| DE | 19632678 A1 * | 2/1998 | | G21F 5/008 |
| DE | 19632678 A1 | 2/1998 | | |
| DE | 19748222 C1 | 7/1999 | | |
| DE | 10217969 A1 | 11/2003 | | |
| EP | 2518731 A2 | 10/2012 | | |
| GB | 2430999 A | 4/2007 | | |

OTHER PUBLICATIONS

Safety Standards KTA 3303 (06/90), Heat Removal Systems for Fuel Assembly Storage Pools in Nuclear Power Plants with Light Water Reactors (Wärmeabfuhrsysteme für Brennelementlagerbecken von Kernkraftwerken mit Leichtwasserreaktoren), KTA-Geschaeftsstelle c/o Bundesamt fuer Strahlenschutz (BfS).

\* cited by examiner

NUCLEAR FACILITY

CROSS-REFERENCE TO RELATED APPLICATION

This is a continuation application, under 35 U.S.C. § 120, of copending International Application PCT/EP2015/055532, filed Mar. 17, 2015, which designated the United States; this application also claims the priority, under 35 U.S.C. § 119, of German Patent Application DE 10 2014 205 085.5, filed Mar. 19, 2014; the prior applications are herewith incorporated by reference in their entirety.

BACKGROUND OF THE INVENTION

Field of the Invention

The invention relates to a nuclear facility having a cooling element for cooling a cooling liquid in a fuel element pool in which a fuel element rack for receiving fuel elements is disposed. The cooling element, which includes a heat exchanger, is constructed for connection to a cooling circuit in a system for cooling the cooling liquid in the fuel element pool.

Two technically different systems are currently predominantly used in order to cool fuel element pools. The first system provides direct cooling of the pool water. For that purpose, the water is removed from the pool by using a pump, cooled in an external cooling unit and then fed back into the pool. If a leak occurs in the cooling circuit in the process, there is a risk of the fill level of the pool lowering.

A second conventional system is based on the use of suspension coolers. In that case, the pool water is cooled by using an intermediate cooling circuit. By contrast with the previously mentioned method, in that system, there is no risk of pool leakage, since firstly no penetrations of the pool are required, and secondly the pool water remains in the pool. However, due to the required heat transfer surfaces, such a system requires a significant amount of installation space in the storage pool.

German Patent Application DE 102 17 969 A1, corresponding to Canadian Patent CA 2 483 182C, discloses an intermediate storage system for fuel elements of a nuclear facility including a passive single-phase cooling circuit. The internal space of a wet storage pool is cooled by using a heat exchanger suspended in the wet storage pool.

German Patent Application DE 29 44 962 A1 discloses a storage pool for fuel elements of nuclear reactors, in which heat exchangers are immersed in the pool water and suspended without a permanent connection to the pool wall.

U.S. Patent Application US 2012/0051484 A1 describes a storage pool for fuel elements, in which heat exchangers are attached to the edge of the pool, including a two-phase cooling circuit, in which the cooling medium in the heat exchangers conducts a phase transition.

The retrofits of redundant and diversitary pool coolings required as part of the "post Fukushima" measures, which are predominantly based on the second outlined variant, frequently face the problem that the necessary installation space in the existing pools is too small for a corresponding quantity of suspension coolers to be accommodated. The only alternative is often that of rearranging the storage space for the fuel elements, which is costly and complicated in terms of gaining authorization. In addition, attaching suspension coolers in a manner which is safe in terms of earthquakes is problematic, since there is a reluctance to modify the existing pool structures by welding or drilling.

SUMMARY OF THE INVENTION

It is accordingly an object of the invention to provide a nuclear facility, which overcomes the hereinafore-mentioned disadvantages of the heretofore-known facilities of this general type and which provides a cooling element that can be integrated in a space-efficient manner in an already existing fuel cooling pool in a corresponding system for cooling a cooling liquid.

With respect to the cooling element, the above-mentioned problem is solved in that the cooling element is sized and configured in such a way that it can be disposed and/or attached in a free position for a fuel element in the fuel element rack. Other advantageous embodiments of the invention are described below.

The invention is based on the consideration that, due to current safety requirements for nuclear facilities, the need for cooling systems which are reliable, can be replaced in a modular manner and are redundant or can be used in a supplementary manner, has drastically increased. Known systems are usually very complex in terms of construction, and uncertainties also may arise with respect to the safety of the new structure and thus also to the reauthorization.

For these reasons, a technical system would thus be desirable which can be implemented with no or only minor modifications to the configurations of the cooling pool and the cooling systems.

As has now been recognized, a technical system of this type for cooling the pool water can be implemented by using existing installation spaces or spaces which have previously been used to place other components for the accommodation of the cooling elements. As has additionally been recognized, free slots or compartments in the fuel element rack are particularly suited to this purpose. For this purpose, the cooling elements must be sized accordingly, i.e. adapted to the specified dimensions in terms of the diameter or cross section thereof, and optionally also in terms of the length thereof. In addition, they should be configured in such a way that they can be safely inserted and removed again and can be disposed in a sturdy manner. In some circumstances, each cooling element can also be longer than the fuel element which it replaces, so that it can project, for example, upwards out of the case or compartment which is assigned thereto in the fuel element rack. A type of funnel which conducts the pool water can also be attached at the upper end as a type of intake.

Advantageously, each cooling element in principle thus has the typical dimensions of a fuel element. Purely by way of example, as a rough guideline for the typical dimensioning, it is mentioned in this regard that a typical fuel element of a pressurized-water reactor contains 15×15 fuel rods and has a length of approximately 4500 mm and a square cross section having an edge length of 250 mm. A fuel element of a pressurized-water reactor of the EPR type has, for example, 18×18 fuel rods and accordingly a greater edge length and fuel elements for boiling-water reactors have for example 8×8 fuel rods and accordingly a smaller edge length. However, there are also, for example, fuel elements having a hexagonal cross section or yet another shape. Furthermore, the cooling element can deviate from the typical dimensions if the fuel element rack, which is also referred to as a fuel element case, has special dimensions which are produced specifically for this application.

Preferably, the cooling element is in the form of a suspension cooling element for suspension in the fuel element rack. Preferably, after mounting, the cooling element is then disposed in one of the free positions for a fuel element. Alternatively, the cooling element is disposed next to the fuel element cases or outside the outer wall of the fuel element rack. A fuel element compartment is then used to receive a holder which fixes the cooling element. In this variant, the spatial dimensions of the cooling element are not limited by the size of the compartment.

In one possible embodiment, the heat exchanger includes a coolant channel for the passage of a coolant which is conducted in the associated cooling circuit, the cooling element including at least one coolant supply connection and at least one coolant discharge connection for connection to and integration in the cooling circuit. A cooling element of this type is suitable, in particular, for a single-phase cooling circuit in which the coolant absorbs heat in the heat exchanger, but in so doing, does not change physical state.

In a preferred embodiment, however, the cooling element is constructed for integration in a two-phase cooling circuit, wherein at least one condensate channel is provided for feeding the coolant into a condensate collector, wherein the heat exchanger includes at least one vaporizer channel for guiding the vaporized coolant into a vapor collector, and wherein the cooling element further includes a supply line and a return line for connection to the cooling circuit. Two-phase cooling circuits or heat transportation circuits, in which the circulating coolant changes physical state in the vaporizer from the liquid to gaseous state and subsequently changes back again in a condenser, which is located outside the fuel element pool, allow generally increased rates of heat transportation by comparison with single-phase cooling circuits.

In terms of construction, each cooling element or the cooler thus preferably includes a plurality of tubular coolant channels for the coolant circulating in the cooling circuit, which, in the installation position, are oriented preferably in parallel with the longitudinal direction of the compartments in the fuel element rack. Of these, preferably a comparatively small proportion is used for supplying condensate to the lower condensate collector (in a downstream flow), and the greater proportion is used for vaporizing the condensate and for guiding the vapor/liquid mixture produced in this way to the upper vapor collector (in an upstream flow). Instead of or in addition to the pipes, the cooler may also include plates through which a flow passes. The pool water flows between the pipes or plates, preferably from top to bottom, through corresponding cavities or channels, and is cooled by heat being emitted to the coolant in the cooling circuit, which coolant is preferably brought to boiling point thereby. Firstly, the vapor or condensate collector interconnects the pipes which are connected in parallel in terms of flow, and secondly, it should be ensured by using suitable recesses or the like that the pool water can flow through the collector.

The interpretation as to what proportion of the cross-sectional area of the cooling element is used for the pipes/plates conducting the coolant in the cooling circuit and what proportion is used for the downstream flow of the pool water is determined in each case according to the given thermodynamic constraints.

Optionally, the functions of a plurality of cooling elements of this type can also be combined, for example by a common vapor collector in the case of a corresponding connection of the pipe or connection lines.

In the various embodiments, the lines through which the cooling element is connected to the cooling system can be constructed to be rigid or flexible. In any case, they should be constructed to be pressure-resistant.

With respect to the system, the above-mentioned problem is solved by a fuel element rack and at least one cooling element of the type described which can be inserted or is inserted therein.

With respect to the fuel element pool, the above-mentioned problem is solved in that the fuel element pool is filled with a cooling liquid, in particular water (pool water), and in that a system of the type described above is disposed therein. The fuel element pool is preferably a storage pool for fuel elements, in particular a wet storage pool, a cooling pool, an intermediate storage pool or permanent disposal pool.

With respect to the nuclear facility, the above-mentioned problem is solved by a fuel element pool of this type. The nuclear facility preferably further includes a cooling system which is configured in the manner of a circuit, including at least one recirculating cooler for connection to each cooling element. The cooling system can be configured to be active or passive according to requirements.

The advantages of the invention lie, in particular, in the fact that, by using the cooling elements, a relatively simple and robust cooling of fuel element storage pools is achieved. As a result, it is possible to modify or supplement pool-cooling systems in a simple manner. Through the use of the modular construction, various approaches are possible, which include both redundant and diversitary cooling options. In addition, it is possible to carry out temporary cooling in the case of a fully loaded core. Since in the future, unprecedented burn-ups may be produced, a cooling system of this type can be used in a very variable manner. It is also possible to react effectively to a reduction in the thermal load by using cooling processes.

Other features which are considered as characteristic for the invention are set forth in the appended claims.

Although the invention is illustrated and described herein as embodied in a nuclear facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
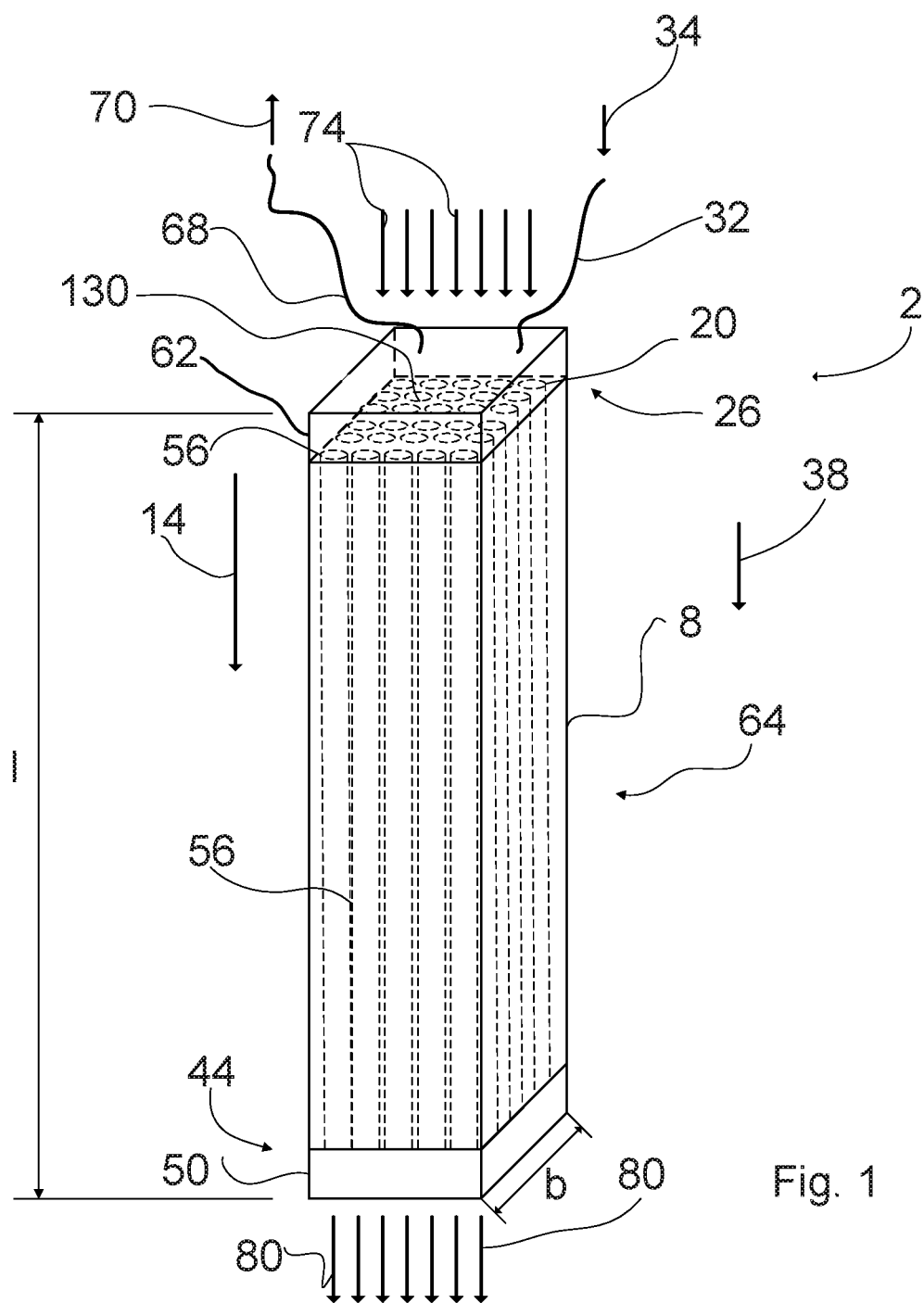
FIG. 1 is a diagrammatic, perspective view of a cooling element according to a preferred embodiment of the invention.

Referring now in detail to the figures of the drawings, in which like parts are provided with the same reference numerals, and first, particularly, to FIG. 1 thereof, there is seen a cooling element 2 which includes a cooling element body 8 that has a number of condensate channels 20 and vaporization channels 56 extending in the longitudinal direction 14 of the cooling element 2. The channels are in the form of pipes which are oriented in parallel. Instead of a plurality of pipes, a single pipe, preferably having a correspondingly large cross section, can also be used (or also plates). The cooling element 2 is connected to a condenser (not indicated therein) of a cooling circuit or is connected into the cooling circuit through at least one supply line 32 which is connected to the cooling element in a head region 26.

Condensate, i.e. coolant in liquid form, is fed through the supply line 32 to the cooling element 2 in a supply direction indicated by an arrow 34. The condensate flows in the condensate channels 20 along a gravitational vector 38 towards a condensate collector 50 which is disposed in a base region 44 of the cooling element 2. The gravitational vector 38 points in the direction of the gravitational acceleration or gravitational force acting on the surface of the earth. From there, the fluid or coolant which, despite being preheated in the condensate collector 50, is still in the form of a liquid, rises through the tubular vaporizer channels 56, which are disposed in the cooling element 2. The fluid or coolant rises in the opposite direction to the gravitational vector 38 into a vapor collector 62 which is disposed at the head region 26. The vaporizer channels 56 thus form a heat exchanger 64 which acts as a coolant vaporizer.

Through the use of the vaporization process, during the rise and vaporization of the coolant, thermal energy is absorbed from the pool water, which cools down as a result. A two-phase cooling system is thus achieved, in which the coolant circulating in the cooling circuit during the passage through the cooling element 2 changes phase state from the liquid to gaseous state.

The vapor is fed from the vapor collector 62 through at least one return line 68, preferably in the form of a rising pipe, to the condenser (not shown in FIG. 1) which is provided for cooling down the coolant in a return direction indicated by an arrow 70, and condensed there. The condensate is supplied back to the cooling element 2 through the supply line 32, which is preferably in the form of a downpipe, so that the cycle ends. The mass flow inside the cooling circuit can be achieved either by using an active mechanical device (pumps, etc.) or in a passive manner (in accordance with the principle of natural convection or free convection).

Through the use of the described cooling, a density gradient is produced on the pool side, so that a flow of the pool water in the direction of the gravitational vector 38 is induced. The downstream flow is part of a so-called convection roll in which the other part is achieved in adjacent fuel elements 98 by using a corresponding upstream flow. The pool water enters intermediate spaces 130, which are disposed between the vaporizer channels 56 and extend in the longitudinal direction, at the head region 26 of the cooling element 2, as is indicated by arrows 74. The pool water then flows through the cooling element 2 in the direction of the gravitational vector 38 and the water emits the heat thereof to the coolant rising in the vaporizer channels 56. It exits the cooling element 2 again at the base region or foot end 44, as is indicated by arrows 80.

If the cooling element 2 projects upwards slightly out of a fuel element rack 92, then the pool water does not have to flow through corresponding recesses in the vapor collector 62, but rather can flow laterally.

Figure 2:
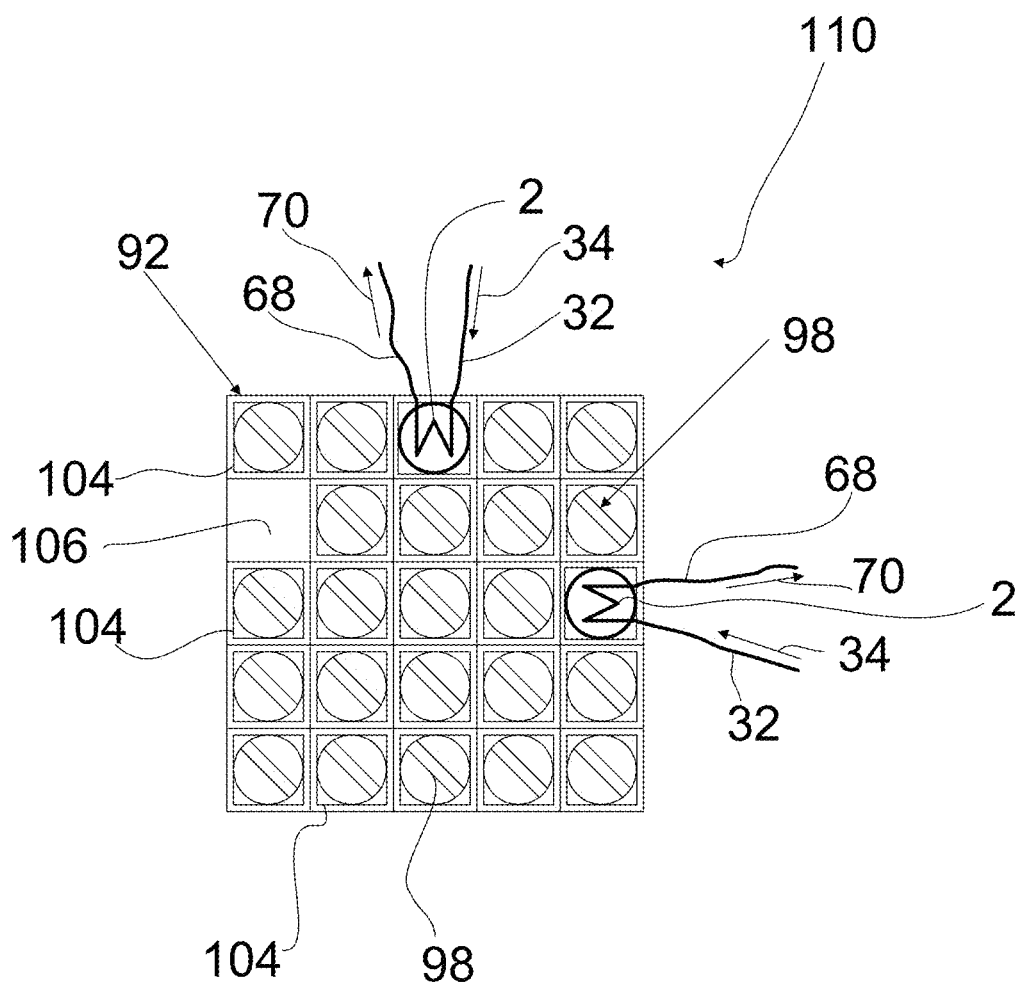
FIG. 2 is a top-plan view of a system for cooling the cooling liquid in a fuel element pool, including a fuel element rack having fuel elements disposed therein and two cooling elements according to FIG. 1 disposed therein.

The cooling element 2 is strengthened, with respect to the spatial dimensions thereof, in order to be inserted or integrated in a fuel element storage rack, or fuel element rack 92 for short as is shown in FIG. 2, in the direction of the gravitational vector 38, i.e. substantially from above. For this purpose, the cooling element 2 is in the form of a suspension cooler. In order to provide for suspension in the fuel element rack 92, the element has a suitable shape and optionally suitable projections or retaining elements. The cooling element 2 can, however, also rest on the base of the fuel element rack 92.

In FIG. 2, the fuel element rack 92 including inserted fuel elements 98 is shown in a plan view from above. The fuel element rack 92 is constructed, in terms of the cross section thereof when viewed in a plan view, as a two-dimensional grid. A plurality of fuel elements 98 are inserted in the fuel element rack 92. In this case, the fuel element rack 92 has a free position 106.

In the present embodiment, the fuel element rack 92 includes 25 integration or insertion spaces or compartments 104 (slots) for fuel elements 98. In two of the insertion spaces, cooling elements 2 are inserted instead of fuel elements 98. In extreme cases, all of the insertion spaces can be occupied by cooling elements 2.

In this case, the cooling elements 2 have a length l in the longitudinal direction 14 thereof, which length substantially corresponds to that of the fuel elements 98. However, the length l can also be selected so as to be slightly greater, so that each cooling element 2 then projects upwards out of the fuel element rack 92, and the pool water can also flow in laterally (see above). In this case, each cooling element 2 has a substantially constant square cross section over the entire length thereof. The width b of each cooling element 2 substantially corresponds to the clear span of the compartment 104 which is provided to receive the fuel element. Due to these dimensions, each cooling element 2 fits into a compartment 104 in a similar manner to a fuel element 98.

In a variant which is not shown in greater detail, cooling elements 2 can be disposed outside the fuel element rack 92. However, the fixing takes place on the fuel element rack 92 and more specifically preferably by using a holder which engages in an empty compartment 104 and is attached therein.

The fuel element rack 92 and the cooling elements 2 which are disposed therein or thereon form a system 110 for cooling the cooling liquid in a fuel element pool.

Figure 3:
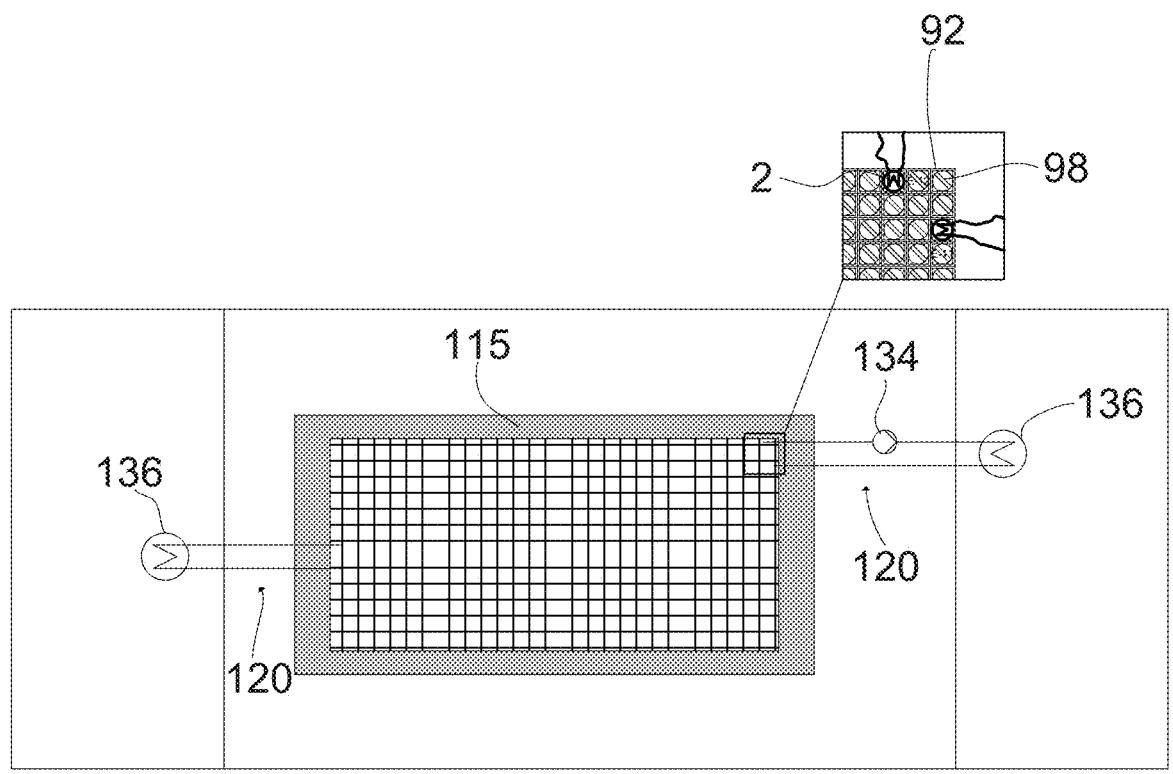
FIG. 3 is a top-plan view of a fuel element pool equipped with a cooling system according to FIG. 2.

FIG. 3 is a diagrammatic view of a fuel element pool 115, in this case, for example, in the case of an external storage facility (for intermediate storage), including a fuel element rack 92 disposed therein, which receives cooling elements 2 in at least some of the positions which were originally provided for fuel elements 98. The cooling elements 2 are each connected individually or bundled into groups in cooling circuits 120. The cooling circuits 120 can be operated both actively (by using corresponding pumps 134) and passively. In order to cool down the coolant heated in the cooling elements 2, corresponding recirculating coolers 136 are disposed inside or outside the building surrounding the fuel element pool 115 and thermally coupled to a suitable heat sink. In the case of a two-phase cooling circuit 120, which is preferably used, the cooling elements 2 act as vaporizers, and the recirculating coolers 136 act as condensers for the coolant conducted in the circuit.

Figure 4:
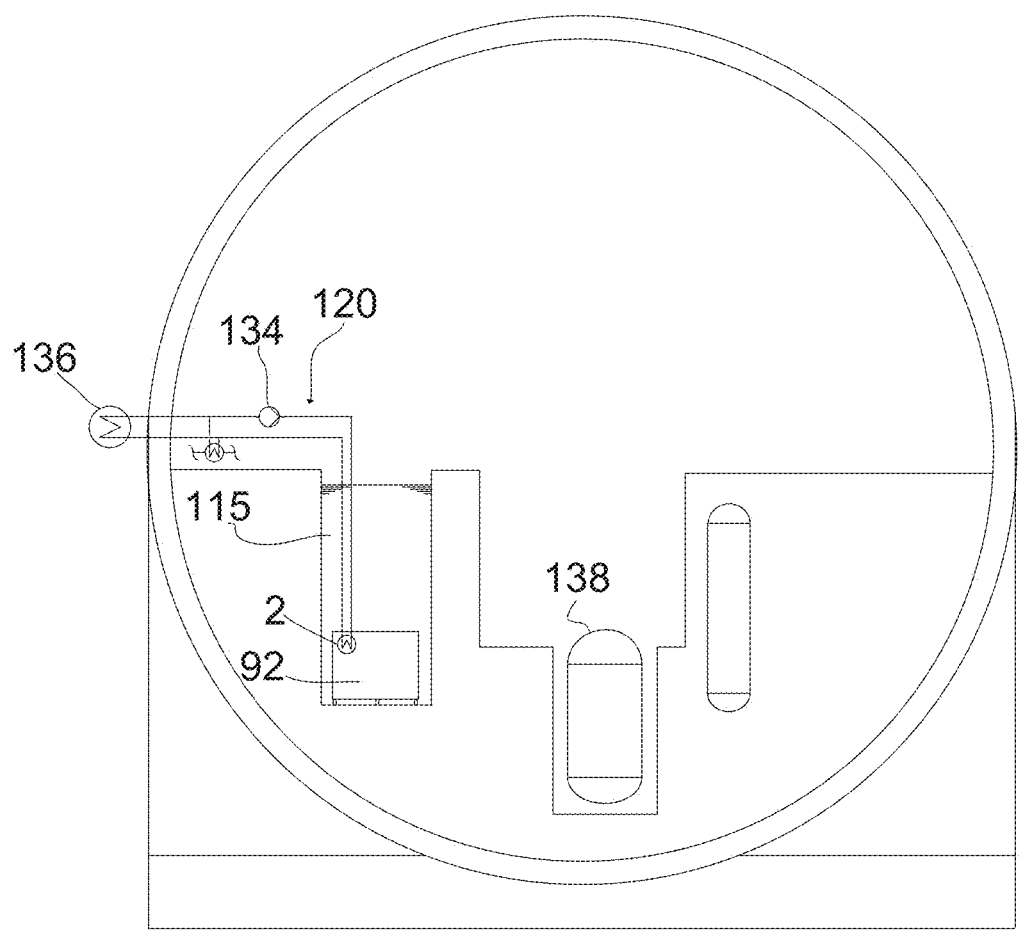
FIG. 4 is a vertical-sectional view through a nuclear power plant including a fuel element pool and an associated cooling system according to FIG. 3.

The same applies analogously to the nuclear power plant shown by way of example in FIG. 4, which includes a fuel element pool 115 (cooling pool) that is located in a reactor building, next to a reactor cavity containing a reactor pressure vessel 138.

The invention claimed is:

1. A nuclear facility, comprising:
   a fuel element pool filled with a first cooling liquid;
   a fuel element rack disposed in said fuel element pool, said fuel element rack including fuel element compartments configured for receiving fuel elements;
   said fuel elements received in said compartments and being in direct contact with the cooling liquid in said fuel element pool; and
   a cooling circuit including a second cooling liquid; and
   a cooling element disposed in one of said fuel element compartments instead of one of said fuel elements, said cooling element being immersed in the first cooling liquid, being connected in said cooling circuit and acting as a heat exchanger through which the first cooling liquid and the second cooling liquid can flow, said cooling element facilitating heat exchange between the first cooling liquid and the second cooling liquid.

2. The nuclear facility according to claim 1, wherein said cooling element is constructed for insertion in said one of said compartments in said fuel element rack.

3. The nuclear facility according to claim 2, wherein said cooling element has a cross sectional area that is the same as a cross-sectional area of one of said fuel elements, wherein the cross-sectional area of the one of said fuel elements is perpendicular to a central longitudinal axis of the one of said fuel elements.

4. The nuclear facility according to claim 1, wherein said cooling element includes at least one coolant channel for passage of the second cooling liquid circulating in said cooling circuit.

5. The nuclear facility according to claim 1, wherein said cooling element includes two channels and an intermediate space located between said two channels, wherein said intermediate space is configured for passage of the first cooling liquid located in said fuel element pool.

6. The nuclear facility according to claim 1, wherein said cooling element includes:
   a condensate collector;
   at least one condensate channel for feeding the second cooling liquid into said condensate collector;
   a vapor collector;
   at least one vaporizer channel for conducting the second cooling liquid vaporized in said at least one vaporizer channel into said vapor collector;
   a supply line configured for supplying the second cooling liquid from said cooling circuit to said at least one condensate channel; and
   a return line configured for feeding the second cooling liquid, which is vaporized, from said vapor collector to said cooling circuit.

7. The nuclear facility according to claim 5, wherein said two channels are parallel to each other and extend in a longitudinal direction of said fuel element compartments.

8. The nuclear facility according to claim 5, wherein said two channels are configured for receiving a circulation of the second cooling liquid.

\* \* \* \* \*